US008640162B2

United States Patent
Chen et al.

(10) Patent No.: US 8,640,162 B2
(45) Date of Patent: Jan. 28, 2014

(54) SYSTEM AND METHOD FOR DISTRIBUTING ADVERTISEMENTS IN AN INTERNET PROTOCOL TELEVISION SYSTEM

(75) Inventors: Wenge Chen, Austin, TX (US); Eric Puetz, Georgetown, TX (US); Guangtian Liu, Cedar Park, TX (US); Yetik Serbest, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1024 days.

(21) Appl. No.: 11/599,182

(22) Filed: Nov. 14, 2006

(65) Prior Publication Data

US 2008/0114648 A1 May 15, 2008

(51) Int. Cl.
*H04N 7/10* (2006.01)
*H04N 7/025* (2006.01)
*H04N 7/173* (2011.01)

(52) U.S. Cl.
USPC .................................. 725/34; 725/35; 725/96

(58) Field of Classification Search
USPC .............................. 725/32, 34–35, 33, 36, 96
See application file for complete search history.

(56) References Cited

U.S. PATENT DOCUMENTS

| 6,298,348 B1 * | 10/2001 | Eldering ....................... 709/206 |
| 6,615,039 B1 | 9/2003 | Eldering |
| 6,799,326 B2 | 9/2004 | Boylan, III et al. |
| 6,816,857 B1 * | 11/2004 | Weissman et al. ...................... 1/1 |
| 7,567,958 B1 * | 7/2009 | Alspector et al. ............. 715/234 |
| 7,913,276 B2 * | 3/2011 | Hirayama ........................ 725/36 |
| 2002/0067730 A1 | 6/2002 | Hinderks et al. |
| 2002/0072966 A1 | 6/2002 | Eldering et al. |
| 2003/0074670 A1 * | 4/2003 | Penk et al. ....................... 725/96 |
| 2003/0084441 A1 * | 5/2003 | Hunt .................................. 725/32 |
| 2003/0105824 A1 * | 6/2003 | Brechner et al. .............. 709/206 |
| 2003/0229893 A1 * | 12/2003 | Sgaraglino ...................... 725/34 |
| 2004/0015399 A1 * | 1/2004 | Maggio ........................... 705/14 |
| 2004/0148421 A1 | 7/2004 | Achtermann et al. |
| 2004/0172650 A1 * | 9/2004 | Hawkins et al. ................ 725/34 |
| 2004/0186778 A1 * | 9/2004 | Margiloff et al. ............... 705/14 |
| 2004/0194131 A1 * | 9/2004 | Ellis et al. ....................... 725/35 |
| 2005/0015800 A1 | 1/2005 | Holcomb |
| 2006/0168664 A1 * | 7/2006 | Frank et al. ..................... 726/27 |
| 2007/0083425 A1 * | 4/2007 | Cousineau et al. ............. 705/14 |

FOREIGN PATENT DOCUMENTS

WO  WO 02/19581 A1  3/2002

* cited by examiner

*Primary Examiner* — Pankaj Kumar
*Assistant Examiner* — Randy Flynn
(74) *Attorney, Agent, or Firm* — G. Michael Roebuck (57) ABSTRACT

A method for delivering targeted advertisement data to opt-in subscribers in an internet protocol television (IPTV) system is disclosed, the system comprising selecting an advertising target group of opt-in IPTV subscribers based on an advertiser's advertising target request; and multicasting an advertisement from an IPTV advertising server to the advertising target group. A system for performing the method is disclosed.

27 Claims, 6 Drawing Sheets

SYSTEM AND METHOD FOR DISTRIBUTING ADVERTISEMENTS IN AN INTERNET PROTOCOL TELEVISION SYSTEM

FIELD OF THE DISCLOSURE

The present disclosure relates generally to distributing targeted advertising in a television system.

BACKGROUND

Advertisers can potentially save advertisement dollars by targeting their advertisements to a selected audience rather than indiscriminately broadcasting their advertisements to a general population of recipients. Advertisement distributors and providers that use a targeting advertisement model can correspondingly increase their revenue per advertisement impression by providing targeted advertisement options for advertisers.

Targeted advertisements have historically been sent to large targeted geographic areas such as the general population of a particular city, so that regional advertisers reach only those advertisement recipients in a particular region who are deemed by the advertiser as most likely to be responsive to their regional advertisements.

DETAILED DESCRIPTION

In a particular embodiment of the present invention a method for delivering targeted advertisement data to opt-in subscribers in an internet protocol television (IPTV) system is disclosed. The method includes selecting an advertising target group of opt-in IPTV subscribers based on an advertiser's advertising target request and multicasting an advertisement from an IPTV advertising server to the advertising target group. In another particular embodiment each subscriber in the advertising target group of opt-in IPTV subscribers is a currently active opt-in IPTV subscriber.

In another particular embodiment the method further includes receiving opt-in advertising selection data from end user client devices associated with the opt-in IPTV subscribers. In another particular embodiment the advertising target group is based on a trade off between a correlative advertising interest index for the opt-in IPTV subscribers and advertising price. In another particular embodiment the advertising price is based on currently available IPTV bandwidth between the IPTV advertising server and the advertising target group of opt-in IPTV subscribers. In another particular embodiment the advertising price is inversely related to the currently available IPTV bandwidth between the IPTV advertising server and the advertising target group of opt-in IPTV subscribers.

In another particular embodiment the method further includes accepting a request for follow on advertisement data from an end user IPTV client device associated with an opt-in IPTV subscriber in the advertising target group and sending the follow on advertisement data to the opt-in IPTV viewer in the advertising target group based on the currently available bandwidth. In another particular embodiment the follow on advertisement data is video follow on advertising data inserted at the IPTV advertising server when currently available IPTV bandwidth between the IPTV advertising server and the IPTV viewer is greater than a first network bandwidth percentage availability. In another particular embodiment the follow on advertisement data is web link advertisement data sent when the currently available bandwidth between the IPTV advertising server and the IPTV viewer is less than a second percentage, wherein the second percentage is less than the first percentage. In another particular embodiment the follow on advertisement data is bookmark data sent to requesting IPTV subscriber for viewing video follow on advertisement later when bandwidth between the IPTV advertising server and the IPTV viewer is less than a third percentage, wherein the third percentage is less than the second percentage.

In another particular embodiment a computer readable medium containing a computer program for delivering targeted advertisement data to opt-in subscribers in an IPTV system is disclosed. The computer program includes instructions to select an advertising target group of opt-in IPTV subscribers based on an advertiser's advertising target request and instructions to multicast an advertisement from an IPTV advertising server to the advertising target group. In another particular embodiment in the computer program instructions each subscriber in the advertising target group of opt-in IPTV subscribers is a currently active opt-in IPTV subscriber.

In another particular embodiment the computer program further includes instructions to receive opt-in advertising selection data from end user client devices associated with the opt-in IPTV subscribers. In another particular embodiment in the computer program instructions the advertising target group is based on a trade off between a correlative advertising interest index for the opt-in IPTV subscribers and advertising price. In another particular embodiment in the computer program instructions the advertising price is based on currently available IPTV bandwidth between the IPTV advertising server and the advertising target group of opt-in IPTV subscribers. In another particular embodiment in the computer program instructions the advertising price is inversely related to the currently available IPTV bandwidth between the IPTV advertising server and the advertising target group of opt-in IPTV subscribers.

In another particular embodiment the computer program further includes instructions to accept a request for follow on advertisement data from an end user IPTV client device associated with an opt-in IPTV subscriber in the advertising target group and instructions to send the follow on advertisement data to the opt-in IPTV viewer in the advertising target group based on the currently available bandwidth. In another particular embodiment in the computer program instructions the follow on advertisement data is video follow on advertising data inserted at the IPTV advertising server when currently available IPTV bandwidth between the IPTV advertising server and the IPTV viewer is greater than a first network bandwidth percentage availability. In another particular embodiment in the computer program instructions the follow on advertisement data is web link advertisement data sent when the currently available bandwidth between the IPTV advertising server and the IPTV viewer is less than a second percentage, wherein the second percentage is less than the first percentage. In another particular embodiment in the computer program instructions the follow on advertisement data is bookmark data sent to requesting IPTV subscriber for viewing video follow on advertisement later when bandwidth between the IPTV advertising server and the IPTV viewer is less than a third percentage, wherein the third percentage is less than the second percentage.

In another particular embodiment a system for delivering targeted advertisement data to opt-in subscribers in an internet protocol television (IPTV) system is disclosed. The system includes a processor in data communication with a memory and a computer program in the memory. The computer program includes instructions to select an advertising target group of opt-in IPTV subscribers based on an advertiser's advertising target request and instructions to multicast an advertisement from an IPTV advertising server to the advertising target group. In another particular embodiment in the computer program instructions each subscriber in the advertising target group of opt-in IPTV subscribers is a currently active opt-in IPTV subscriber.

In another particular embodiment the computer program further includes instructions to receive opt-in advertising selection data from end user client devices associated with the opt-in IPTV subscribers. In another embodiment in the computer program instructions the advertising target group is based on a trade off between a correlative advertising interest index for the opt-in IPTV subscribers and advertising price. In another particular embodiment in the computer program instructions the advertising price is based on currently available IPTV bandwidth between the IPTV advertising server and the advertising target group of opt-in IPTV subscribers. In another particular embodiment in the computer program instructions the advertising price is inversely related to the currently available IPTV bandwidth between the IPTV advertising server and the advertising target group of opt-in IPTV subscribers.

In another particular embodiment the computer program further includes instructions to accept a request for follow on advertisement data from an end user IPTV client device associated with an opt-in IPTV subscriber in the advertising target group and instructions to send the follow on advertisement data to the opt-in IPTV viewer in the advertising target group based on the currently available bandwidth. In another particular embodiment in the computer program instructions the follow on advertisement data is video follow on advertising data inserted at the IPTV advertising server when currently available IPTV bandwidth between the IPTV advertising server and the IPTV viewer is greater than a first network bandwidth percentage availability. In another particular embodiment in the computer program instructions the follow on advertisement data is web link advertisement data sent when the currently available bandwidth between the IPTV advertising server and the IPTV viewer is less than a second percentage, wherein the second percentage is less than the first percentage. In another particular embodiment in the computer program instructions the follow on advertisement data is bookmark data sent to requesting IPTV subscriber for viewing video follow on advertisement later when bandwidth between the IPTV advertising server and the IPTV viewer is less than a third percentage, wherein the third percentage is less than the second percentage.

In another particular embodiment a data structure in memory is disclosed. The data structure includes an opt-in subscriber identifier field for containing data indicative of a subscriber identifier for an opt-in IPTV subscriber; an opt-in advertising types selected field for storing data and indicating which types of advertising the particular subscriber indicated by the subscriber identifier has selected to receive advertising; and a correlative advertising interest index field indicating a score for the particular subscriber indicating the interest of the particular subscriber for different product or advertising types.

In another particular embodiment the data structure further includes an available bandwidth field for containing a percentage of available bandwidth between the advertising server and the particular subscriber indicated in the opt-in subscriber identifier field.

In another particular embodiment the data structure further includes an advertising price field for each advertising price; an advertising target request field for storing data indicative of an advertiser's target request to reach a particular advertising target group based on an advertising target request; and a subscriber currently active field for containing data that indicates that the subscriber is currently watching the television associated with the end user client device or STB. In another particular embodiment the advertising price field includes data that indicates what price is charged for delivering a particular advertisement type to a particular subscriber.

Traditional television (TV) advertisement is broadcast based, in which every broadcast audience member receives the same TV advertisement at the same time. This traditional kind of TV advertisement model was built upon the broadcast based cable, satellite or over-air TV networks. Broadcast based TV advertisement may not be cost effective for all advertisers from business perspective. The purpose of advertisement is to pass information to potential customers. Broadcast based advertisement fits large business well; such as national retailer chains, drink companies, wireless phone companies, etc. because almost every audience member is their potential customer. However, for most of the small and medium size businesses, only a small part of the audiences are potential customers.

For example, a diaper advertisement is not applicable to all audience members because a family will probably not buy diapers if there are no babies in the family. So the better advertising solution is to only send a particular advertisement (diaper advertisement) to a particular targeted audience group (families with babies) rather than an indiscriminate broadcast to every member of an audience. In other words, audience members will only be sent the advertisement in which he/she is interested or related. In an illustrative embodiment a TV service provider can send multiple advertisements at the same time period and charge less for each advertisement than for a broadcast advertisement, but maintaining the effectiveness within the target group of viewers. For example, during a prime 30 minute time advertising slot, 8 advertisements can be sent out to all the audiences with traditional broadcast based TV network advertising; but in an illustrative embodiment, 80 or more advertisements can be sent out to 10 different audience groups over a multicast IPTV network. If IPTV service provider charges 50% of the advertisement price of traditional broadcast advertising TV, IPTV service provide will still have advertising revenue several times higher than that of traditional broadcast TV advertising. In an illustrative embodiment a multicast based IPTV system supports personalized advertisement with very high network bandwidth utilization. An illustrative embodiment implements Personalized TV advertisement system integrates this feature with voice, video and data services.

In an illustrative embodiment a particular advertisement is sent to a particular selected audience group. The particular advertisement is also referred to herein as Personalized TV Advertisement (PTVA). In other words, any audience member need only watch the advertisements in which he/she is interested or to which he/she are correlatively related.

Figure 1:
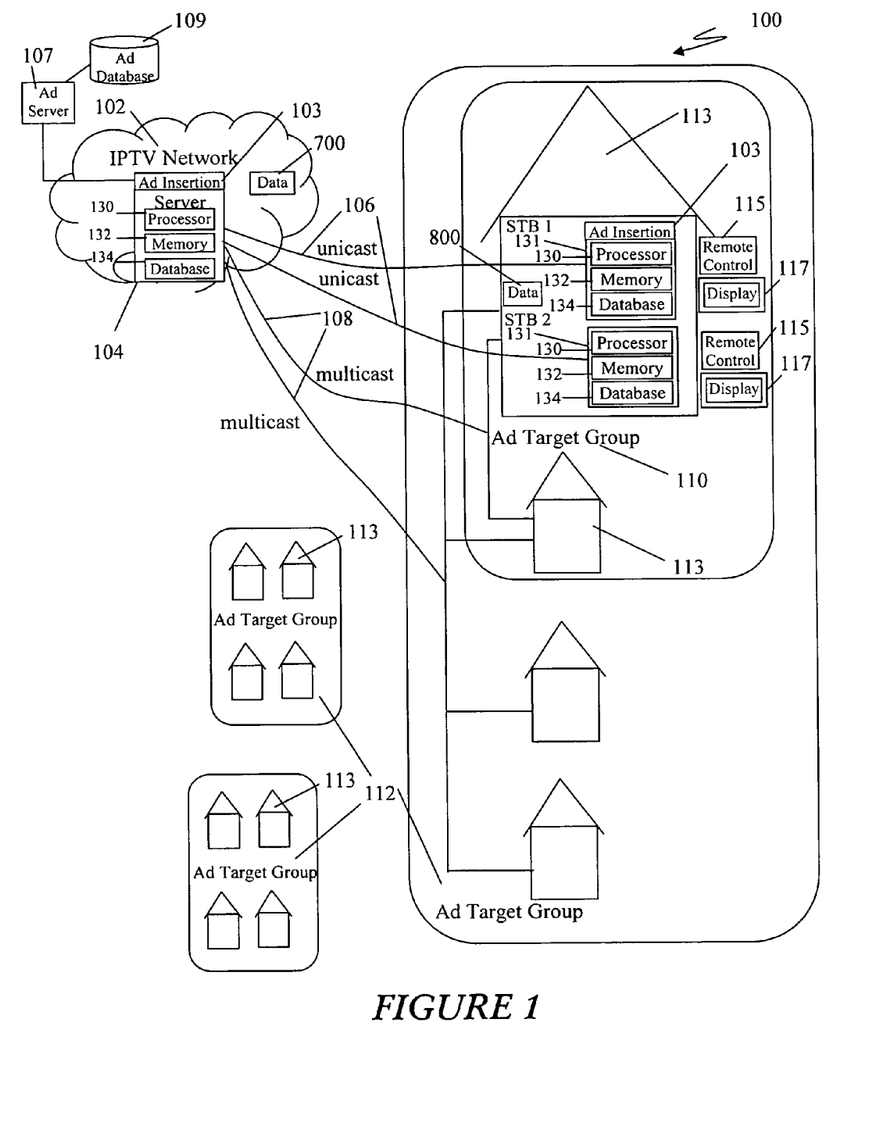
FIG. 1 depicts an illustrative embodiment of an internet protocol television (IPTV) system delivering targeted advertising to an end user client device.

Turning now to FIG. 1 as shown in FIG. 1 the IPTV network 102 delivers content and advertising to the server 104. The server 104 delivers content and advertising via unicast or multicast depending on the target group of end user client devices to which the advertising is directed. As shown in FIG. 1 groups 112 receive multicast 108 advertising from server 104. Sub-groups 110 receive multicast 108 advertising from server 104. Individual households receive unicast 106 advertising to set top box 111. More then one set top box can be located in an individual household 113 and each individual set top box can receive a separate unicast or multicast advertising stream. Having a separate advertising displayed at each set top box (STB) 131 tailored to target the subscriber watching television at that particular STB. Each server 104 and STB 131 contains a processor 130, a memory 132 and a database 134. Each STB 131 has an associated remote control 115 and display 117.

FIG. 1 depicts an illustrative advertising insertion system wherein advertising data can be inserted into a video multicast or unicast at the IPTV server or at the end user client device, for example, an STB. Advertising data can be inserted into an IPTV video stream via advertising insertion device 103 at the IPTV server 104 or the STB 131. The IPTV server includes an advertising server 107 and an advertising database 109. The advertising data is selected from the advertising database and delivered by the advertising server 107 to the IPTV server 104. The advertising server processor keeps track of available bandwidth between the advertising server and a target group of selected opt-in IPTV subscribers. This bandwidth data can be stored in the memory 132, database 134 or a data structure in the memory as described below in FIG. 4.

Figure 2:
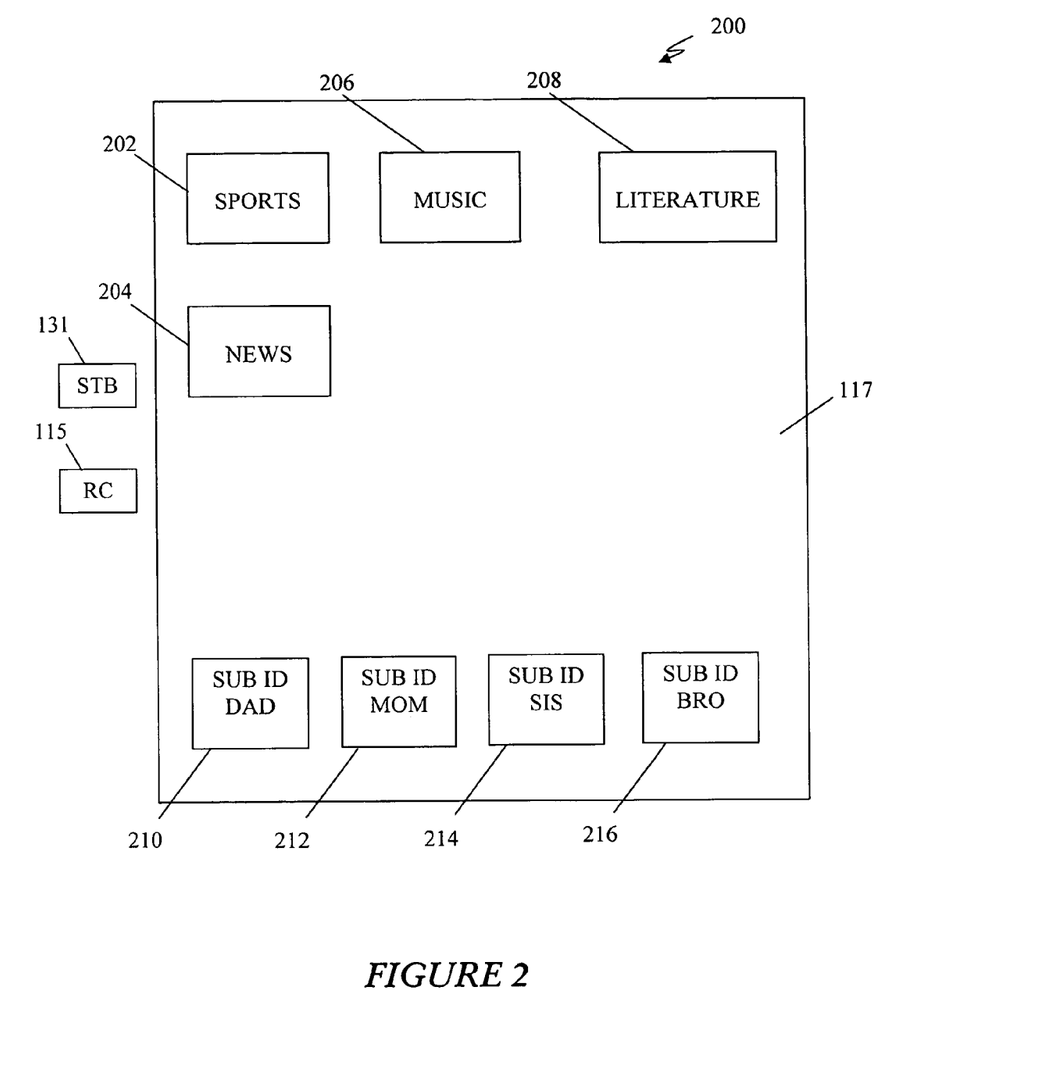
FIG. 2 depicts an illustrative embodiment of an advertising selection screen for enabling an IPTV subscriber to opt-in to receive selected targeted advertising type using a remote control device.

Turning now to FIG. 2, FIG. 2 depicts an illustrative embodiment of an advertising selection screen for enabling a user to opt-in to receive selected targeted advertising using a remote control device. A user can utilize the remote control to select which targeted advertising groups they want to join to receive advertising. By selecting a particular advertising type, the user will opt-in to receive targeted advertising of the selected type.

In an illustrative embodiment IPTV subscribers use an advertisement selection screen 117 as shown in FIG. 2 to select advertising categories or types for which to opt-in. For example, advertising relating to sports 202, news 204, music 206, or literature 208 can be selected to be sent to a subscriber. The subscriber is identified by a subscriber ID which may be a number or a name such as Dad 210, Mom 212, Sister 214, and Brother 216. A subscriber uses remote control 115 to manipulate the opt-in screen 117 to perform the advertising opt-in process. A STB 131 is associated with the display screen 117 and remote control 115. In an alternative embodiment additional input devices can be used to perform the opt-in advertisement selection process including but not limited to a telephone or a web interface. The web interface or telephone might also be an end user client device such as a PDA, web notebook, and portable computer or any other mobile or electronic device capable of communicating opt-in data to either the STB or the advertising server database.

Figure 5:
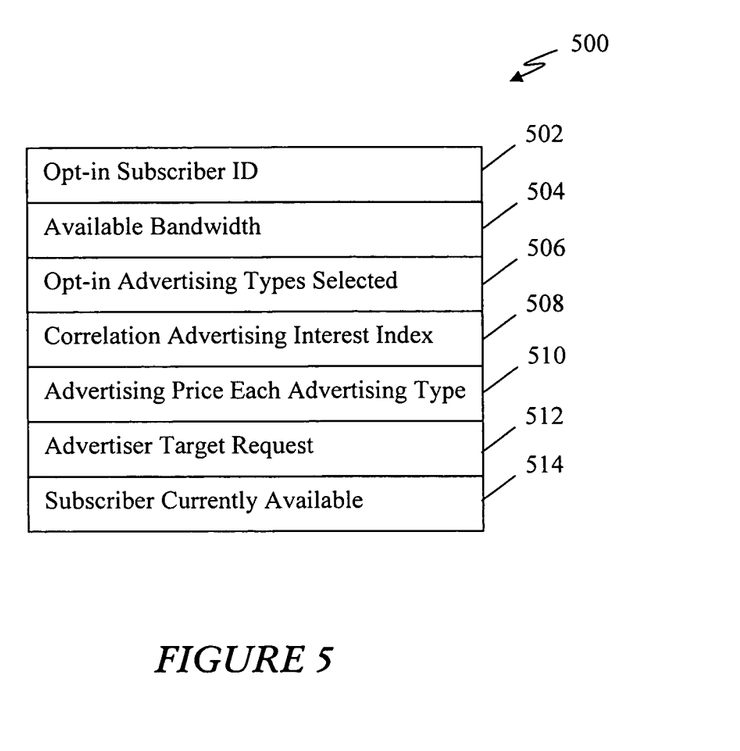
FIG. 5 is an illustrative embodiment of a machine for performing functions disclosed.

The opt-in advertising selections are collected and stored in a database at the advertising server 107. In an illustrative embodiment each family member or subscriber associated with a particular STB has an advertising profile generated and stored in the database. The advertising profile includes data stored in the database in data structure 500 described below, which includes but is not limited to those advertising types for which the indicated subscriber has opted-in. The advertising profile data structure 500 is also dynamically updated to include the available IPTV network bandwidth between the advertising server and a particular subscriber, whether or not the particular subscriber is a current viewer (currently watching TV), and a price for each type advertisement which might be sent to a particular IPTV subscriber that has opted-in to receive the advertising.

An expert system or other suitable computer process matches available advertisements submitted by advertisers to opt-in IPTV subscribers based on an advertiser's advertising target request to select an advertising target group. In an illustrative embodiment an expert system matches advertisements associated with an advertiser's target group to an advertising target group of opt-in IPTV subscribers. In performing a match or correlation between the opt-in IPTV subscribers and an advertiser's advertising request. The expert system compares the demographics and opt-in advertising types for the opt-in IPTV subscribers to the advertisers target demographics and advertising types to formulate correlative advertising interest index. The expert system performs a trade off between a best match of opt-in IPTV subscribers and the price of the advertisements based on a sliding price scale. The sliding price scale is based on the number of advertisements purchased by a subscriber plus a particular advertisement. The price may be one price (for example 10¢) for the first 100 recipients, a second price (for example 7¢) for the next 400 recipients and a third price (for example 2¢) for the next 500 recipients. The advertisers want to reach those opt-in subscribers that are most interested in their product as indicated by their advertising correlative interest index. The advertiser may include lesser interested opt-in subscribers (having a lower correlative advertising index) because of an attractive declining price scale that makes additional lower interest IPTV subscribers cheaper to reach.

Thus it may be the case that the first 100 recipient opt-in IPTV subscribers may have a correlative advertising interest index for the particular advertising target of 10 on a scale of 1 to 10 and the next 100 recipients have a correlative advertising interest index of only 7 on a scale of 1 to 10, however, the sliding scale price break for additional recipients makes these additional opt-in IPTV subscribers attractive to the advertiser in order to achieve a price break on the declining price scale and broader coverage. Likewise the next several 100 recipients may have a correlative advertising interest index of only 3 but the price break for including them makes them attractive to the advertiser and thus all three groups of advertising recipients are included in an advertising target group in order to achieve a best or near best desired advertising coverage based on the average correlative advertising index of the recipients and the average price to reach them with a targeted advertising.

There is also a dynamic trade off between the sliding advertising price scale that is the number of targeted recipients desired to be reached by an advertiser, and the net bandwidth available between an advertising server and the advertising target group of IPTV subscribers. There is also a dynamic trade off between the net bandwidth available between the IPTV advertising server and the STBs associated with the target group of opt-in IPTV subscribers and the advertisement price. The advertisement price that is the price charged for sending an advertisement to each member of a target group of opt-in IPTV subscribers is inversely related to the amount of available bandwidth between the advertising server and the advertising target group of opt-in IPTV subscribers. Thus the more bandwidth that is available between an advertising server and a particular advertising target group of opt-in IPTV subscribers the cheaper the advertisements are.

During a lull or diminished demand for IPTV bandwidth between the advertising server and the advertising target group deliver of the advertisements will be priced cheaper than during the period of high demand. Thus it may be the case that during the Super Bowl when there are a lot of subscribers watching there will be a great deal of demand for the advertisement space and a great deal of demand for the bandwidth associated with distributing and delivering the advertisements. Thus these advertisements distributed during a high demand on the bandwidth may be higher than during a lull or lesser demand period when there is more bandwidth available to distribute the advertisements.

There is also a dynamic trade off between advertisement types for both advertisements sent to an advertising target group and for follow on advertisements requested by members of the advertising target group who received the initial advertisement. The follow on advertisement types are requested to by an opt-in subscriber to obtain additional information related to an advertisement and include but are not limited to video on demand unicast from the advertising server, video data in unicast to STB, web pages unicast for display on the IPTV display device and bookmarks (indices into video or other advertising data stored on the advertising server) which are sent to a STB to mark a particular advertisement to be displayed later by an opt-in IPTV subscriber. There are also connections that are provided to the advertisers which may directly connect an opt-in IPTV subscriber to a particular advertiser via voice over IP connections, web talk connections or other data connections provided through the internet or wireless networks connected to the IPTV system. Thus there is a trade off between the scale or quantity of advertising recipients, price, and available network bandwidth and correlative advertising interest index.

Figure 3:
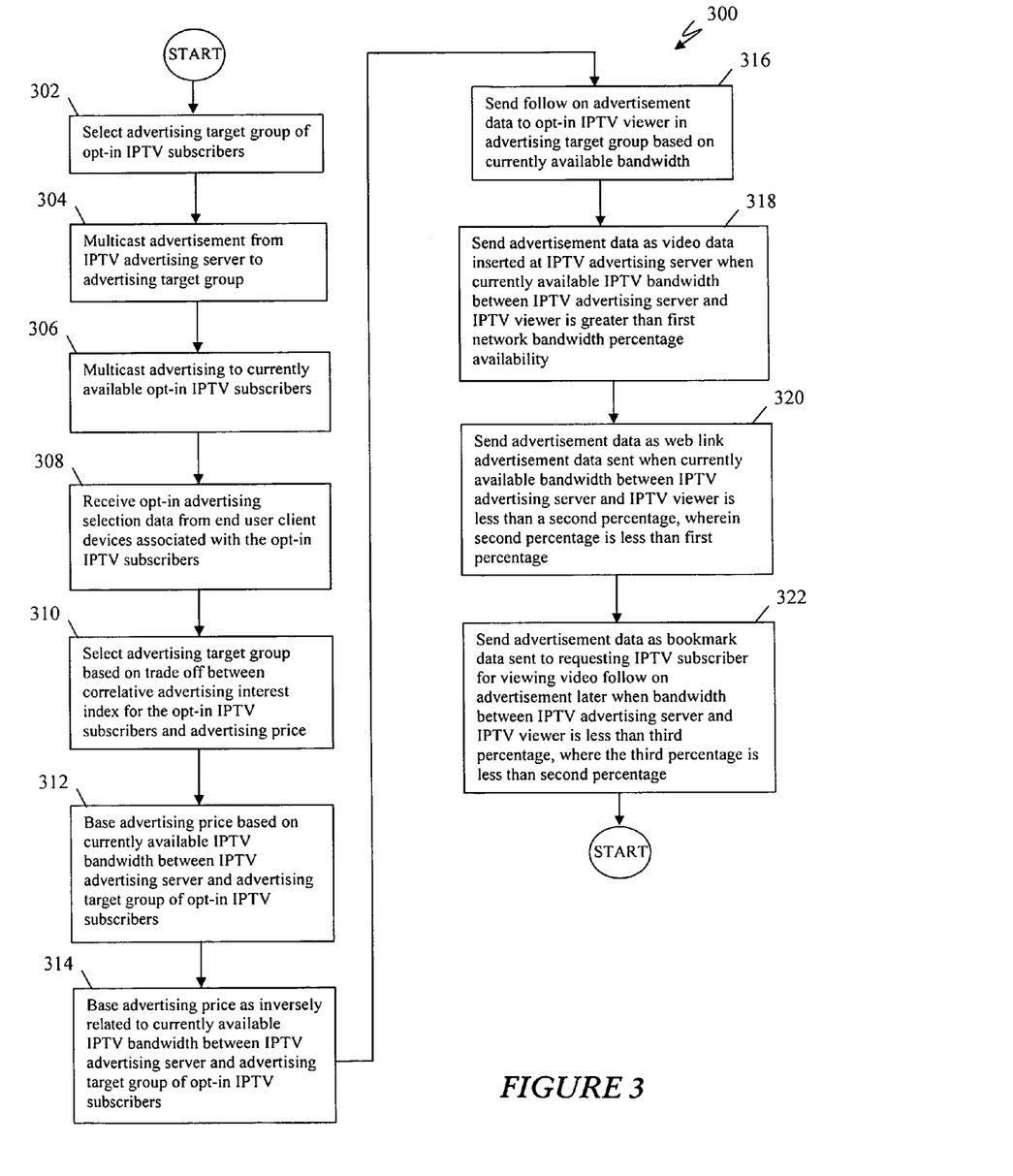
FIG. 3 depicts a flow chart of functions performed in an illustrative embodiment.

Turning now to FIG. 3 a flow chart of functions 300 is illustrated which are performed in an illustrative embodiment. An advertising target group of opt-in IPTV subscribers is selected at block 302. The target group is selected to match an advertiser's selection criteria of interested IPTV subscribers. Multicasting Advertisement data is multicast from the IPTV advertising server to the advertising target group at block 304. The advertising data is sent to currently active opt-in IPTV subscribers at block 306. Opt-in advertising selection data is received from end user client devices associated with the opt-in IPTV subscribers at block 308. Selection of advertising target groups based on a trade off between correlative advertising interest indexes for the opt-in IPTV subscribers and advertising price is performed at block 310.

Advertising price is calculated based on currently available IPTV bandwidth between IPTV advertising server and advertising target group of opt-in IPTV subscribers at block 312. The base advertising price as inversely related to currently available IPTV bandwidth between IPTV advertising server and advertising target group of opt-in IPTV subscribers at block 314. Follow on advertisement data is sent from the advertising server to an end user IPTV client device associated with opt-in IPTV subscriber in advertising target group at block 316. Follow on advertisement data is sent as unicast or multicast to an opt-in IPTV subscriber in the advertising target group based on currently available bandwidth at block 318. Follow on advertisement data can be video follow on advertising data inserted at IPTV advertising server when currently available IPTV bandwidth between IPTV advertising server and IPTV viewer is greater than a first network bandwidth percentage availability (e.g., 50%) at block 320. Follow on advertisement data is web link advertisement data sent when currently available bandwidth between IPTV advertising server and IPTV viewer is less than a second percentage, wherein second percentage is less than first percentage at block 322. Follow on advertisement data can be sent to a requesting IPTV subscriber for viewing a video follow on advertisement later when bandwidth between IPTV advertising server and IPTV viewer is less than third percentage, where the third percentage is less than second percentage at block 324. The first, second and third bandwidth percentages can be set at any suitable level for reliable network operations, for example, 50 percent, 70 percent and 75 percent.

Figure 4:
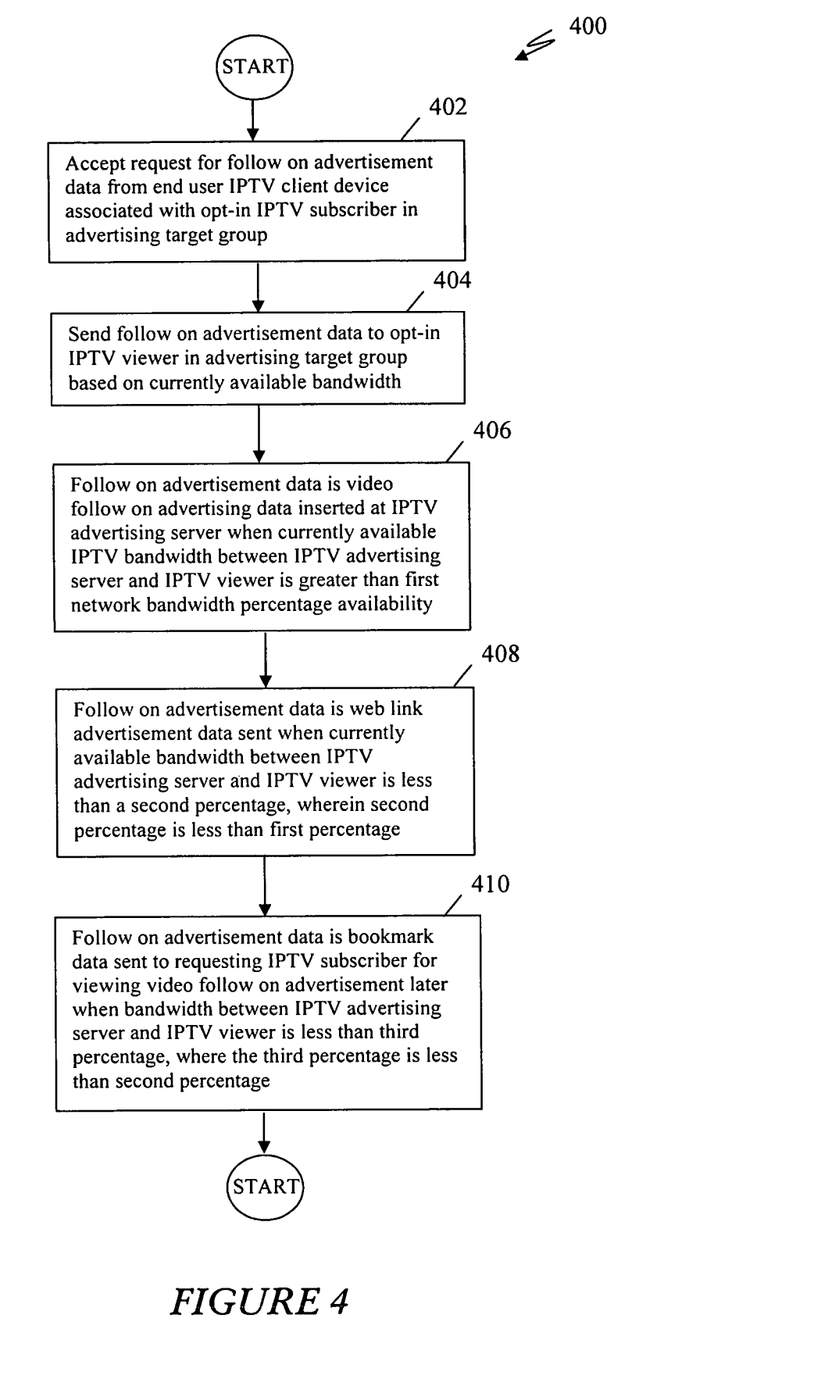
FIG. 4 depicts a data structure provided in an illustrative embodiment.

Turning now to FIG. 4 a flow chart of functions 400 performed in a particular illustrative embodiment is illustrated. A request is accepted for follow on advertisement data from the end user IPTV client device associated with the opt-in IPTV subscriber in the advertising target group at block 402. Follow on advertisement data is sent to the opt-in IPTV viewer in the advertising target group based on currently available bandwidth at block 404. Follow on advertisement data is video follow on advertising data inserted at the IPTV advertising server when currently available IPTV bandwidth between the IPTV advertising server and the IPTV viewer is greater than first network bandwidth percentage availability at block 406. Follow on advertisement data is web link advertisement data sent when currently available bandwidth between the IPTV advertising server and the IPTV viewer is less than a second percentage, wherein the second percentage is less than the first percentage at block 408. Follow on advertisement data is bookmark data sent to a requesting IPTV subscriber for viewing video follow on advertisement later when bandwidth between the IPTV advertising server and the IPTV viewer is less than third percentage, where the third percentage is less than the second percentage at block 410.

Turning now to FIG. 5, a data structure for an illustrative embodiment is depicted as stored in memory. The data structure 500 includes an opt-in subscriber identifier field 502 for containing data indicative of a subscriber ID for an opt-in IPTV subscriber. The subscriber ID identifies the STB or end user device ID associated with a particular subscriber and may indicate one or more subscribers for a particular STB and one or more STBs for a particular subscriber. The data structure also includes an available bandwidth field 504 for containing a percentage of available bandwidth between the advertising server and the particular subscriber indicated in the subscriber ID field. The available bandwidth is dynamically updated and is used to calculate a price for delivering advertisements to the particular subscriber. The data structure also includes an opt-in advertising types selected field 506 for storing data and indicating which types of advertising the particular subscriber indicated by the subscriber ID has selected to receive advertising.

The data structure further includes a correlative advertising interest index field 508 indicating a score for the particular subscriber indicating the interest of the particular subscriber for different product or advertising types. The data structure further includes an advertising price field for each advertising price 510. The advertising price field includes data that indicates what price is charged for delivering a particular advertisement type to a particular subscriber. In another particular embodiment the data structure further includes an advertising target request field 512 for storing data indicative an advertiser's target request to reach a particular advertising target group based on an advertising target request. The advertising target request might include a demographic factor such as males 18-35 interested in sports who have opted-in sports advertising to receive an advertisement for a new popular tennis shoe. In another particular embodiment a subscriber currently active field 514 is provided in the data structure for containing data that indicates that the subscriber is currently active watching the television associated with the end user client device or STB. This can be part of the opt-in procedure wherein a subscriber signs on or opts-in to receive advertising upon initializing or turning on television set to watch programming. The subscriber may indicate that they are currently active or via a menu entry on the display or the IPTV system can indicate that the STB is currently tuned to a particular channel or is involved in a particular activity indicative of a particular subscriber's participation indicating that they are currently active.

Figure 6:
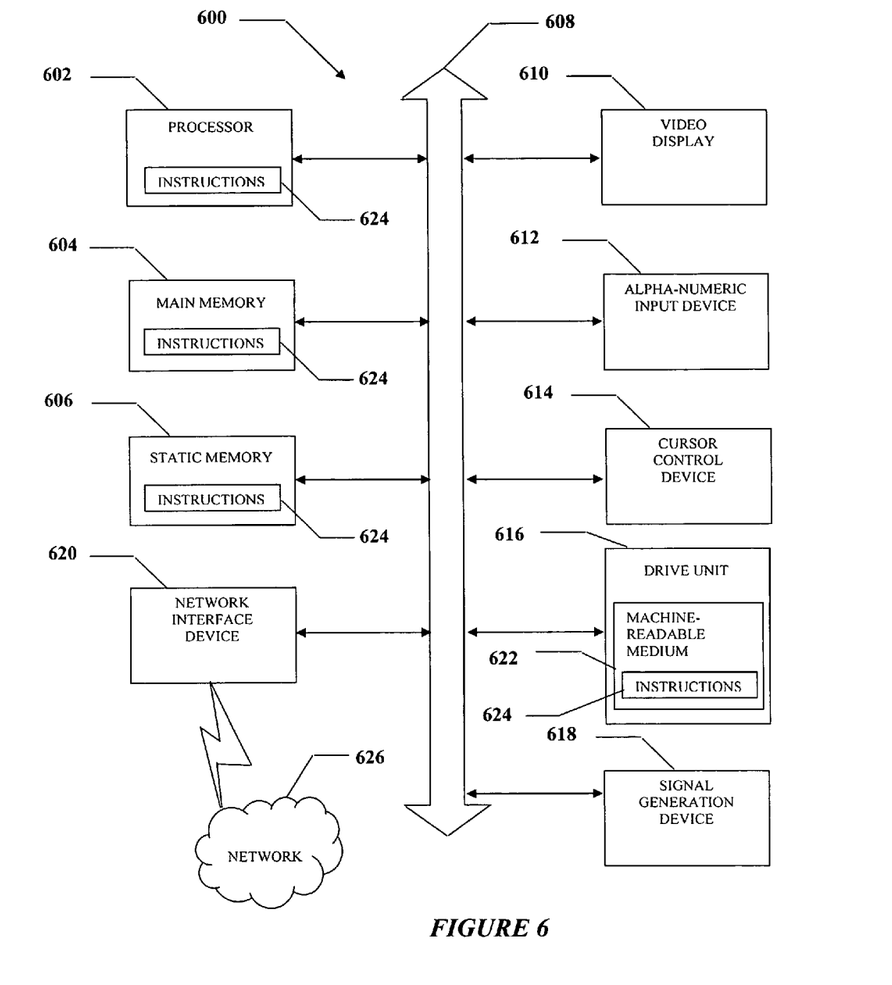
FIG. 6 is a diagrammatic representation of a machine in the form of a computer system.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., liquid crystals display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for delivering targeted advertising data in an internet protocol television system, the method comprising:
   selecting an advertising target group of opt-in internet protocol television subscribers based on an advertiser's advertising target request and an advertising price proportional to a correlative advertising interest index for an advertising type for each of the advertising target group of opt-in internet protocol television subscribers;
   multicasting advertising data selected from an internet protocol television advertising server to the advertising target group of opt-in internet protocol television subscribers;
   receiving a request for the follow-on advertising data from a particular opt-in internet protocol television subscriber in the advertising target group;
   selecting an advertising type to fulfill the request for the follow-on advertising data for the particular opt-in internet protocol television subscriber from video on demand unicast from the internet protocol television advertising server, web page data, and bookmark data, wherein the bookmark data indicates an index into advertising data stored on the internet protocol television advertising server, wherein the advertising type is based on the correlative advertising interest index for the advertising type for follow-advertising data for the particular opt-in internet protocol television subscriber, wherein the correlative advertising interest index indicates a degree of interest in the and reflects a different price for each of a plurality of advertising types for the follow on advertising data;
   and
   sending follow-on advertising data in the form of a selected follow-on advertising type based on the correlative advertising interest index, to the particular opt-in internet protocol television subscriber in the advertising target group in response to the request for follow-on advertising, wherein the follow-on advertising sent to the particular opt-in internet protocol television subscriber includes video follow-on advertising data inserted at the internet protocol television advertising server when available internet protocol television bandwidth between the internet protocol television advertising server and the particular opt-in internet protocol television subscriber is greater than a first network bandwidth percentage availability, the follow-on advertising data is web link advertisement data when the currently available bandwidth between the internet protocol television advertising server and the one internet protocol television subscriber is less than a second percentage, wherein the second percentage is less than the first percentage and the follow-on advertising data is bookmark data sent to the particular opt-in internet protocol television subscriber when the bandwidth between the internet protocol television advertising server and the particular opt-in internet protocol television subscriber is less than a third percentage, where the third percentage is less than the second percentage.

2. The method of claim 1, the method further comprising:
   receiving opt-in advertising selection data from end user client devices associated with the particular opt-in internet protocol television subscriber.

3. The method of claim 1, wherein the advertising target group is based on a trade off between a correlative advertising interest index for the particular opt-in internet protocol television subscriber and an advertising price, wherein the advertising price is based on a sliding price scale proportional to the correlative advertising interest index and the advertising type, wherein each of a plurality of advertising types has a different price.

4. The method of claim 3, wherein the advertising price is based on currently available internet protocol television bandwidth between the internet protocol television advertising server, and the advertising target group of opt-in internet protocol television subscribers and the correlative index for the advertising type.

5. The method of claim 3, wherein the advertising price is inversely related to the currently available internet protocol television bandwidth between the internet protocol television advertising server and the advertising target group of opt-in internet protocol television subscribers.

6. The method of claim 1, further comprising:
   accepting the request for follow on advertising data from an end user internet protocol television client device associated with the particular opt-in internet protocol television subscriber in the advertising target group; and
   sending the follow on advertising data to the particular opt-in internet protocol television subscriber in the advertising target group based on the currently available bandwidth.

7. The method of claim 6, wherein the follow on advertising data is video follow on advertising data inserted at the internet protocol television advertising server when currently available internet protocol television bandwidth between the internet protocol television advertising server and the internet protocol television viewer is greater than a first percentage.

8. The method of claim 6, wherein the follow on advertising data is web link advertisement data sent when the currently available bandwidth between the particular opt-in internet protocol television advertising server and the opt-in internet protocol television subscriber is less than a second percentage, wherein the second percentage is less than the first percentage.

9. The method of claim 6, wherein the follow on advertisement data is bookmark data sent to the particular opt-in internet protocol television subscriber for viewing video follow-on advertisement later when bandwidth between the particular internet protocol television advertising server and the particular internet protocol television viewer is less than a third percentage, wherein the third percentage is less than the second percentage.

10. A tangible non-transitory computer storage readable medium containing a computer program for delivering targeted advertising data to opt-in subscribers in an internet protocol television system, the computer program comprising:
   instructions to select an advertising target group of the opt-in internet protocol television subscribers based on an advertiser's advertising target request and an advertising price proportional to a correlative advertising interest index indicating a particular opt-in internet protocol television subscriber interest in an advertising type;
   instructions to multicast an advertisement selected, from an internet protocol television advertising server to the advertising target group; and
   instructions to receive a request for follow-on advertising data from a particular opt-in internet protocol television subscriber in the advertising target group;
   instructions to select an advertising type for the follow-on advertising data from selections of the particular opt-in internet protocol television subscriber of opt-in advertising types from the group consisting of video on demand unicast from the internet protocol television advertising server, web page data, bookmark indices data into video data and advertising data stored on the internet protocol television advertising server, based on a correlative advertising interest index for an advertising type for follow on advertising data for the particular opt-in internet protocol television subscriber, wherein the correlative advertising interest index indicates an interest in the advertising type for the follow-on advertising for the particular opt-in internet protocol television subscriber and indicates a different price for each of a plurality of advertising types for the follow on advertising; and
   instructions to send follow-on advertising data in the advertising type for the follow-on advertising to the particular opt-in internet protocol television subscriber in response to a request for follow-on advertising from the particular opt-in internet protocol television subscriber wherein the follow-on advertising data sent to the particular opt-in internet protocol television subscriber includes video follow-on advertising data inserted at the internet protocol television advertising server when available internet protocol television bandwidth between the internet protocol television advertising server and the particular opt-in internet protocol television subscriber is greater than a first network bandwidth percentage availability, the follow-on advertising data is web link advertisement data when the currently available bandwidth between the internet protocol television advertising server and the one internet protocol television subscriber is less than a second percentage, wherein the second percentage is less than the first percentage and the follow-on advertising data is bookmark data sent to the particular opt-in internet protocol television subscriber when the bandwidth between the internet protocol television advertising server and the particular opt-in internet protocol television subscriber is less than a third percentage, where the third percentage is less than the second percentage.

11. The medium of claim 10, the computer program further comprising:
   instructions to receive opt-in advertising selection data from an end user client devices associated with the particular opt-in internet protocol television subscriber.

12. The medium of claim 10, wherein in the computer program instructions, the advertising target group is selected based on a trade off between a correlative advertising interest index for the particular opt-in internet protocol television subscriber and an advertising price, wherein the advertising price is based on a sliding price scale proportional to the correlative advertising interest index and the advertising type.

13. The medium of claim 12, wherein in the computer program instructions, the advertising price is based on available bandwidth between the internet protocol television advertising server and the advertising target group of opt-in internet protocol television subscribers, and the correlative advertising interest index for the particular follow-on advertising type.

14. The medium of claim 12, wherein in the computer program instructions, the advertising price is inversely related to an available bandwidth between the internet protocol television advertising server and the particular opt-in internet protocol television subscriber.

15. The medium of claim 10, the computer program further comprising:
   instructions to accept at a server a request for follow on advertising data from an end user internet protocol television client device associated with the particular opt-in internet protocol television subscriber; and
   instructions to send the follow on advertising data to the particular opt-in internet protocol television subscriber based on currently available bandwidth.

16. The medium of claim 15, wherein in the computer program instructions, the follow on advertising data is video follow on advertising data inserted at the internet protocol television advertising server, when available bandwidth between the internet protocol television advertising server and the particular internet protocol television subscriber is greater than a first percentage.

17. The medium of claim 15, wherein in the computer program instructions, the follow on advertising data is web link advertisement data sent when available bandwidth between the internet protocol television advertising server and the particular opt-in internet protocol television viewer is less than a second percentage, wherein the second percentage is less than the first percentage.

18. The medium of claim 15, wherein in the computer program instructions, the follow on advertising data is bookmark data sent to the particular opt-in internet protocol television subscriber for viewing video follow on advertisement later when bandwidth between the internet protocol television advertising server and the particular opt-in internet protocol television subscriber is less than a third percentage, wherein the third percentage is less than the second percentage.

19. A system for delivering targeted advertising data to opt-in subscribers in an internet protocol television system, the system comprising:
- a processor in data communication with a memory embedded in a non-transitory computer readable medium;
- a computer program embedded in the memory, the computer program comprising instructions to select an advertising target group of opt-in internet protocol television subscribers based on an advertiser's advertising target request and an advertising price proportional to a correlative advertising interest index;
- instructions to multicast an advertisement selected from an internet protocol television advertising server to the advertising target group;
- instructions to receive a request for follow-on advertising data from a particular opt-in internet protocol television subscriber in the advertising target group;
- instructions to select a follow-on advertising type for the particular opt-in internet protocol television subscriber based on a correlative advertising interest index for an advertising type for the particular opt-in internet protocol television subscriber, wherein the correlative index indicates an interest in the advertising type for the particular internet protocol television subscriber and indicates a different price for each of a plurality of advertising types for the particular internet protocol television subscriber; and
- instructions to send follow-on advertisement data in the form of a selected follow-on advertising type, to the particular opt-in internet protocol television subscriber, wherein the follow-on advertising data sent to the particular opt-in internet protocol television subscriber includes video follow-on advertising data inserted at the internet protocol television advertising server when available internet protocol television bandwidth between the internet protocol television advertising server and the particular opt-in internet protocol television subscriber is greater than a first network bandwidth percentage availability, the follow-on advertisement data is web link advertisement data when the currently available bandwidth between the internet protocol television advertising server and the one internet protocol television subscriber is less than a second percentage, wherein the second percentage is less than the first percentage and the follow-on advertising data is bookmark data sent to the particular opt-in internet protocol television subscriber when the bandwidth between the internet protocol television advertising server and the particular opt-in internet protocol television subscriber is less than a third percentage, where the third percentage is less than the second percentage.

20. The system of claim 19, the computer program further comprising:
- instructions to receive opt-in advertising selection data from end user client devices associated with the particular opt-in internet protocol television subscriber.

21. The system of claim 19, wherein in the computer program instructions, the advertising target group is based on a trade off between a correlative advertising interest index for the opt-in internet protocol television subscribers, the advertising type and the advertising price.

22. The system of claim 21, wherein in the computer program instructions, the advertising price is based on currently available bandwidth between the internet protocol television advertising server, the correlative index for the advertising type for the follow-on advertising data and the advertising target group of opt-in internet protocol television subscribers.

23. The system of claim 21, wherein in the computer program instructions, the advertising price is inversely related to the currently available bandwidth between the internet protocol television advertising server and the advertising target group of opt-in internet protocol television subscribers.

24. The system of claim 19, the computer program further comprising:
- instructions to accept a request for a follow on advertising data from an end user internet protocol television client device associated with the particular opt-in internet protocol television subscriber in the advertising target group and instructions to send the follow on advertisement data to the particular opt-in internet protocol television subscriber in the advertising target group based on currently available bandwidth.

25. The system of claim 24, wherein in the computer program instructions the follow on advertisement data is video follow on advertising data inserted at the internet protocol television advertising server when currently available bandwidth between the internet protocol television advertising server and the particular opt-in internet protocol television subscriber is greater than a first percentage.

26. The system of claim 24, wherein in the computer program, the follow on advertising data is web link advertisement data sent when the currently available bandwidth between the internet protocol television advertising server and the particular opt-in internet protocol television subscriber is less than a second percentage, wherein the second percentage is less than the first percentage.

27. The system of claim 24, wherein in the computer program instructions, the follow on advertisement data is bookmark data sent to the particular opt-in internet protocol television subscriber for viewing a video follow on advertisement later when bandwidth between the internet protocol television advertising server and the particular opt-in internet protocol television subscriber is less than a third percentage, wherein the third percentage is less than the second percentage.

* * * * *